July 7, 1936. C. J. COBERLY ET AL 2,046,770
FILTERING DEVICE
Filed Jan. 31, 1933 2 Sheets-Sheet 1

INVENTORS:
CLARENCE J. COBERLY,
EDMOND M. WAGNER,
By
ATTORNEY.

July 7, 1936.   C. J. COBERLY ET AL   2,046,770
FILTERING DEVICE
Filed Jan. 31, 1933   2 Sheets-Sheet 2
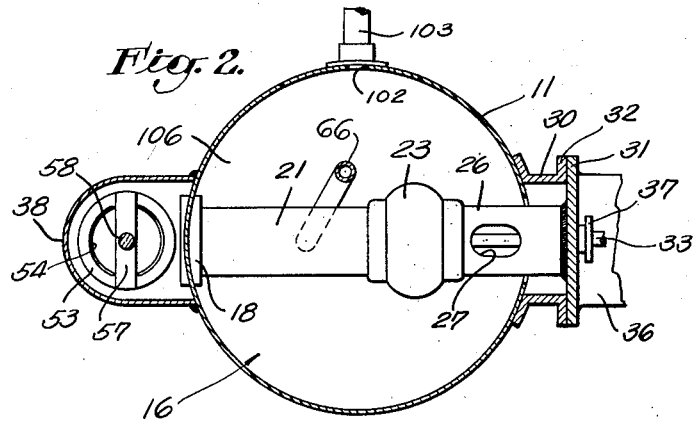
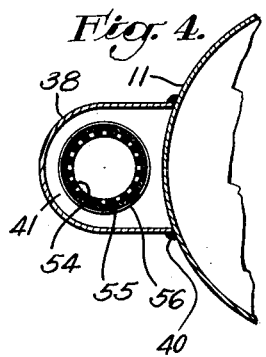
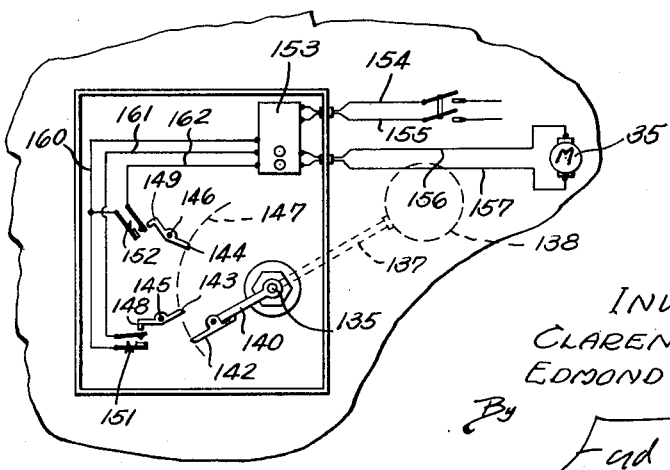
INVENTORS:
CLARENCE J. COBERLY,
EDMOND M. WAGNER,
By
ATTORNEY.

Patented July 7, 1936

2,046,770

UNITED STATES PATENT OFFICE 2,046,770

FILTERING DEVICE

Clarence J. Coberly, Los Angeles, and Edmond M. Wagner, Southgate, Calif., assignors, by mesne assignments, to RoKo Corporation, Reno, Nev., a corporation of Nevada Application January 31, 1933, Serial No. 654,431

15 Claims. (Cl. 210—182)

Our invention relates to a filtering device having an automatically operating means for periodically cleaning the filter element so that a desired filtration capacity will be maintained.

Our invention has for an object to provide a simple and effective means for producing a reverse flow of fluid through a filter element to remove from the surface thereof the accumulated materials which adhere in the form of a filter cake. For this purpose we connect the fluid discharge leading from the filter element to the discharge end of a pump, preferably of centrifugal type, which pump is normally stationary, so that the filtered fluid discharged from the filter proper passes through the pump. A motor and control means therefor are provided for periodically operating the pump which produces a reverse flow of filtered fluid through the outlet passage of the filter device, such reverse flow then passing in reverse direction through the filter element, or filter cloth, to remove from the surface of the filter element solid materials which have accumulated during the filtering action.

It is an object of the invention to provide a device of the character set forth in the preceding paragraph, in which the control means for the motor which drives the reversing pump includes a switch and a timer, such as a telechron, for periodically closing the switch whereby to periodically operate the reversing motor. The time intervals between the periods of operation of the reversing motor may be varied by suitable adjustment of the timing means, in accordance with the characteristics of the filter element and the mixture being filtered. For example, should a filter cake, which would materially retard the flow of fluid through the filter element, accumulate in a five minute period, the timing device may be set so as to operate the reversing motor at four minute intervals, thereby assuring that the capacity of the filter will be kept above a predetermined value.

A further object of the invention is to provide a filtering device which may be used in conjunction with a fluid conducting system in which the fluid is carried under pressure, and is especially adapted for use with fluids containing volatile elements, the filtering device being so constructed that there will be no escape of volatile elements from the fluid conducting system.

A further object of the invention is to provide a filtering device of the above character especially adapted for connection to the production pipe of an oil well, by which filtering device a portion of the oil passing through the production pipe may be filtered and delivered to an external point of utility. One use of the invention is in connection with a fluid operated oil pump lowered into the oil producing zone of on oil well. Such pump includes a pumping element and a motor element operated by fluid pumped through a pipe string extending from the top of the well to the fluid operated pumping device situated within the well. Our invention, being connected to a production pipe leading from the well, filters a portion of the oil produced from the well and delivers the same to the pressure pump which is connected to the fluid motor of the pumping device in the well, thereby assuring minimum wear of the moving parts of the fluid operated motor as a result of operating it entirely by use of oil from which sand and grit has been removed.

A further object of the invention is to provide a device of the foregoing character having a primary chamber and a secondary chamber interconnected through a filter element, such chambers being so constructed that bodies of gas accumulate in the upper portions thereof and contribute to a valuable surging effect during the cleaning of the filter element by reversal of the flow of fluid therethrough.

A further object of the invention is to provide a filtering device of simple and novel character in which the filtering pressure is produced and maintained statically, and which filter pressure is not influenced by the variations in pressure of the oil in the production pipe to which the filtering device is connected.

Further objects and advantages of the invention will be made evident throughout the following part of the specification.

Referring to the drawings, which are for illustrative purposes only,

Fig. 2 is a cross section on a plane represented by the line 2—2 of Fig. 1.

Fig. 4 is a fragmentary cross section on the line 4—4 of Fig. 1.

Fig. 5 is a fragmentary cross section showing an alternative form of control means for the reversing pump.

Fig. 6 is a fragmentary section on a plane indicated by the line 6—6 of Fig. 5.

Figure 1:
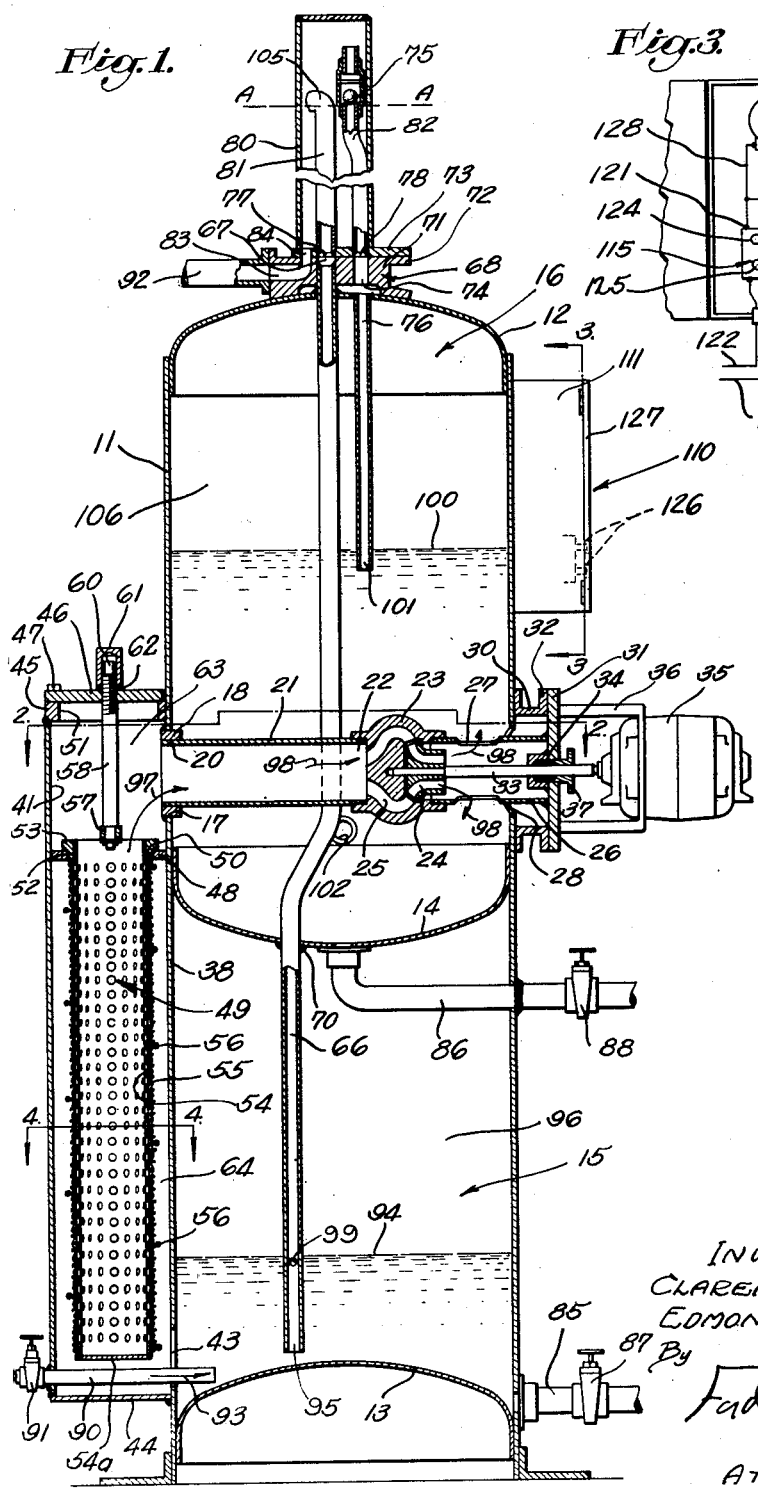
Fig. 1 is a vertically sectioned view of a preferred form of the invention.

In the form of the invention disclosed in Figs. 1 to 4 of the drawings, we provide a cylindrical shell 11 placed in upright position, the upper and lower ends of this shell being closed by end members 12 and 13, and by an intermediately disposed horizontal wall 14 being divided into respectively lower and upper primary and secondary chambers 15 and 16. In the shell 11 above the dividing wall 14 an opening 17 is formed having a sealing ring 18 mounted therein to receive the leftward end 20 of a horizontal pipe 21 which is connected to the discharge end 22 of a centrifugal pump 23 having an impeller 24 therein adapted to drive fluid leftwardly through the pump passages 25. The inlet end of the pump is connected to a supporting member 26 of cylindrical form having openings 27 therein communicating with the interior of the chamber 16. The supporting member 26 extends through an opening 28 in the wall of the shell 11 diametrally opposite the opening 17 and through a saddle fitting 30, to be welded to a cover plate 31 adapted to be bolted to the flange 32 of the fitting 30. The plate 31, the supporting member 26, the pump 23, and the pipe 21 form a simple unit which may be removed from the chamber 16 by detaching the plate 31 from the fitting 30, whereupon the leftward end 20 of the pipe 21 may be pulled from engagement with the ring 18 surrounding the opening 17. From the impeller 24 a shaft 33 extends through a packing means 34 to an electric motor 35 secured to the outer face of the plate 31 by bracket members 36. The packing means 34 is of the ordinary type in which a packing material is compressed around the shaft 33 by use of a gland 37.

A metal wall 38, bent to U-shaped cross section as shown in Fig. 4, is secured by welds 40 to the exterior of the shell 11 to provide a vertical passage 41 connecting at its upper end with the opening 17 and the end 20 of the pipe 21, and having its lower end communicating with the lower part of the primary chamber 15 through an opening 43 in the shell 11. The lower end of the wall member 38 is closed by a horizontal plate 44 preferably secured in place by welding, and the upper end of the wall member 38 is provided with a heavy metal ring 45 to which a cover plate 46 may be detachably secured by use of studs or screws 47. A short distance below the opening 17 the vertical passage 41 is intercepted by a horizontally disposed dividing wall 48 having an opening 50 therethrough smaller than the opening 51 of the ring 45 at the upper end of the wall member 38. A ring member 52 is seated in the opening 50 and has a radial flange 53 which engages the upper face of the dividing wall 48. The ring 52 forms part of a filter element 49 which includes a perforate tube 54 extending downwardly from the ring 52, having its lower end closed by a wall 54a, and having a layer of filter cloth or equivalent material 55 secured thereon by use of a spirally overlapped wire 56. The upper part of the ring 52 is equipped with a diametrally extending bar or spider 57 adapted to be engaged by the lower end of a screw 58 which threads through the cover plate 46 and has the upwardly projecting nut end 60 thereof sealed by means of a threaded cap 61 adapted to be screwed tightly down against a gasket 62 placed around the upwardly projecting part of the screw adjacent the outer face of the cover plate 46. The filter element is in the form of a removable cartridge of a size to pass through the opening 51 of the ring 45 at the upper end of the passage 41. The pressure of the screw 58 serves to tightly seal the flange 53 of the filter element against the upper face of the dividing wall 48 and in such position that the interior of the tubular member 54 communicates, through the space 63 within the wall member 38 above the dividing wall member 48, with the leftward end 20 of the pipe 21, and the exterior of the filter member communicates through the space 64 below the dividing wall 48 with the opening 43 leading into the primary chamber 15. Within the shell 11 an overflow or outlet pipe 66 extends from the chamber 15 through the wall 14 and through the chamber 16 to a vertical opening 67 in a fitting 68 secured preferably centrally upon the upper end wall 12, the wall 14 being sealed around the pipe 16 by simple means such as a weld 70. The fitting 68 has a body portion 71 with a horizontal flange 72 at its upper end to which a plate 73 may be bolted.

Adjacent the opening 67 to which the pipe 66 connects, a vertical passage 74 is formed through the body 71 of the fitting 68. A vertical pipe 76 is disposed in the upper chamber 16 in a position to connect with the lower end of the passage 74, and openings 77 and 78 are provided in the plate 73 in positions to respectively connect to the opening 67 and the passage 74. Welded to the upper face of the plate 73 is a pipe 80 of such diameter that stand pipes 81 and 82 may be extended upwardly therein from the openings 77 and 78 of the plate 73. A check valve 75 is placed at or near the upper end of the pipe 82, as shown in Fig. 1, to prevent contamination of the clean oil in the chamber 16 due to a reverse flow through the pipes 82 and 76. The fitting 68 is also provided with a discharge outlet 83 which communicates through an opening 84 with the interior of the lower end of the pipe 80. Sediment outlets 85 and 86 equipped with valves 87 and 88 may be respectively provided for the primary and secondary chambers 15 and 16.

Where the invention is employed for the purpose of filtering a portion of the production of a well, an oil delivery pipe 90 having a valve 91 therein may connect the chamber 15 with the oil or production tube leading from the top of a well and through which the pumped oil is customarily delivered to a storage tank or a piping system connected with storage tanks. The outlet passage 83 provided by the fitting 68 may be connected to a pipe 92 with other oil transfer pipes, or the pipe 92 may be directly led to a storage tank. The oil entering the chamber 15 from the production pipe 90, as indicated by the arrow 93, will form a level 94 therein above a small gas opening 99 near the lower end 95 of the pipe 66, trapping gas in the space 96 above the oil level 94. As the delivery of oil into the chamber 15 continues, a part of the incoming oil will pass upwardly within the pipe 66 and within the space 64 surrounding the filter element, and as the pressure in the chamber 15 increases, oil will be forced upwardly through the pipe 66 and the stand pipe 81 which connects with the upper end thereof, the overflow from the stand pipe 81 passing downwardly within the enclosing pipe 80 and thence outwardly through the discharge passage 83 into the pipe 92. At the same time the difference in pressure existing between the chambers 15 and 16 will cause oil to flow through the filter element 49 and thence, as indicated by arrows 97 and 98, through the horizontal pipe 21, through the passages 25 and the impeller 24 of the pump, and through the openings 27 in the supporting member 26, into the lower part of the chamber 16 wherein the filtered oil will accumulate until the level 100 thereof reaches a plane above the lower end 101 of the pipe 76. The filtered oil may be withdrawn from the chamber 16 through an outlet 102 which may connect through piping 103 with a pressure pump for feeding the fluid operated pumping mechanism in the well, but should there be no withdrawal of oil, the filtered oil will pass upwardly through the pipe 76 and within the stand pipe 82 to the plane A—A of the outlet end 105 of the stand pipe 81. To prevent a discharge of filtered oil from the chamber 16 through the stand pipe 82, such stand pipe 82 is purposely made slightly longer than the stand pipe 81. Should the volume of gas in the space 106 above the oil level 100 in the chamber 16 be increased sufficiently to drive the oil level 100 down below the lower end of the pipe 76, a portion of the gas will then pass outwardly through the pipe 76 and the stand pipe 82 to the enclosing pipe 80 to be discharged through the outlet passage 83 into the pipe 92. Likewise, an excess of gas accumulating in the space 96 of the lower chamber 15 may force the oil level 94 down below the opening 89 near the lower end 95 of the pipe 66 to permit a discharge of gas through the pipe 66 and the stand pipe 81 into the enclosing pipe 80. A withdrawal of oil from the chamber 16 through the outlet 102 will immediately result in a drop in the level 100 of the oil in the chamber 16, with a consequent reduction of pressure in the chamber 16 to a value less than the pressure in the chamber 15, whereupon a flow of oil through the filter medium 49 will start in an attempt to bring the pressures of the chambers 15 and 16 again into static balance.

Since the chambers 15 and 16 both communicate with the delivery pipe 92 through the enclosing pipe 80, the filtration pressure can never exceed the pressure produced by the static head of oil in the stand pipe 81, which may be varied in length in accordance with conditions of operation. Ordinarily the height of the outlet 105 of the stand pipe 81 above the pipe 90 is established at twenty feet. Accordingly, the pressure in the pipe 92 may vary within wide limits without affecting the pressures controlling the operation of the filter.

The materials filtered from the oil which pass through the filter element, such materials being in this instance silt and sand, accumulate on the outer face thereof, or, in other words, the face thereof presented to the natural or dirty oil, and in more or less time a filter cake is formed which will retard the flow of oil through the filter element. In my device the filtered oil is periodically impelled in reverse direction through the filter element, or, in other words, in a direction reverse to the arrows 97, by operation of the centrifugal pump 23, the impeller of which is so placed that when it is rotated in response to operation of the motor 35, clean oil from the chamber 16 will be forced under pressure through the horizontal pipe 21 in leftward direction and will pass downwardly through the perforate tube 54 of the filter element 49, and then outwardly through the filter material 55, dislodging the accumulated materials or filter cake therefrom, which dislodged materials are washed by the reverse flow of oil out through the opening 43 at the lower end of the space 64 into the lower part of the chamber 15, from whence the materials are removed by the flow of oil from the chamber 15 into the lower end 95 of and through the pipe 66.

The pump 23 is so designed that it will deliver a relatively large flow of fluid under relatively high pressure so that a forceful cleaning action is performed on the filter element 49. The operation of the pump 23 draws the level 100 of the fluid in the chamber 16 down and reduces the pressure in the chamber 16, so that when the pump is stopped, the pressure in the chamber 15 will be materially greater than the pressure in the chamber 16, with the result that the contents of the chamber 16 will be rapidly replenished by the forcing of oil through the cleaned filter element 49.

For controlling the operation of the pump 23, we provide a timing device 110 mounted in a case 111 preferably secured to the shell 11. The timing device 110 is preferably of electrical type including a synchronous motor and has an actuating part 112 which, in response to adjustment of the timing device, may be caused to periodically close a switch 113 which is inserted in a conductor 114 leading from a terminal 109 of a master switch 115 situated in the case 111 through a conduit 116 to a terminal 117 of the motor 35 which operates the pump 23. The other terminal 118 of the motor 35 is connected through a conductor 120 with a terminal 121 of the switch 115. The incoming side of the switch 115 is connected through conductors 122 and 123 with a suitable power source, and the switch 115 is positioned in the case 111 so that the ON and OFF operating buttons 124 and 125 thereof may be manually engaged through openings 126 in the door 127 of the case 111. Whenever the switch 115 is closed, the timing device will be energized through conductors 128 and 130 and will immediately start to operate, with the result that at intervals of time such as five or ten minutes, such as conditions may require, the actuating element 112 will close the switch 113 for a short period of time, thereby energizing the motor 35 to operate the pump 23 and perform an operation of cleaning the filter element 49.

Figure 3:
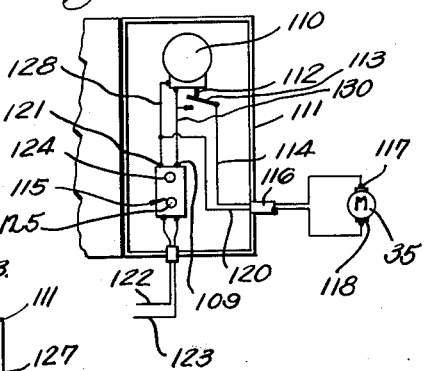
Fig. 3 is a fragmentary section on the line 3—3 of Fig. 1, showing the control means for the filter device.

In the timing device disclosed in Fig. 3, the intervals separating the periods of operation of the flow reversing pump 23 are controlled by a timing device in accordance with a predetermined schedule. In Figs. 5 and 6 we show a means for operating a reversing pump at intervals determined by the condition of the filter element relative to the rate at which the filtered oil is withdrawn from the chamber 16. As best shown in Fig. 5, a horizontal shaft 135 is extended through a packing device 136 mounted on the upper portion of the shell 11. On the inner end of the shaft 135, within the chamber 16, is an arm 137 carrying a float 138 which rises and falls with the fluid level 100. On the outer end of the shaft 135 an arm 140 is secured, this arm 140 swinging upwardly as the arm 137 swings downwardly. On the end of the arm 140 is a dog 142 which ordinarily extends outwardly, as shown in Fig. 6, but which may rotate upwardly in clockwise direction when the arm 140 is moving downwardly and the extremity of the dog 142 engages either a lever 143 or a lever 144. The levers 143 and 144 are mounted on pivots 145 and 146 so as to project into the path of movement 147 of the point of the dog 142; accordingly, as the arm 140 swings upwardly, the dog 142 will consecutively engage the levers 143 and 144 and swing them in anti-clockwise direction. The levers have extensions 148 and 149 respectively adapted to swing downwardly in response to upward swinging movement of the levers 143 and 144 and close switches 151 and 152 adapted to respectively close and open a magnetic relay switch 153 which receives electric current through conductors 154 and 155 and when in closed position permits a flow of electric energy through conductors 156 and 157 to the motor 35. The switches 151 and 152 are respectively connected with the opening and closing magnets of the relay switch 153 through conductors 160, 161, and 162 and correspond to the ordinary button switches or other switches employed for the operation of remote control relays.

The operation of the mechanism shown in Figs. 5 and 6 is as follows: As the flow of oil through the filter medium 49 is retarded due to the accumulation of a filter cake, so that the withdrawal of oil through the outlet 102 exceeds the inlet of filtered oil through the pipe 21, the level 100 will drop down, permitting the float 138 to fall a corresponding distance and swing the arm 140 upwardly to bring the dog 142 into engagement with the lever 143, whereupon the lever 143 will be rotated in anti-clockwise direction to cause closing of the switch 151. By closing the switch 151, the closing magnet of the relay switch 153 is energized, and the switch 153 is correspondingly closed, thereby energizing the motor 35. The operation of the pump 23 rapidly draws filtered oil from the chamber 16 so that the level 100 therein will further recede and further drop the float 138 so as to cause the arm 140 to swing upwardly beyond the lever 143. When the level 100 is lowered to such a point that the dog 142 engages and rotates the lever 144, the releasing or opening switch 152 connected with the releasing magnet of the switch 153 will be energized, and the switch 153 will be opened, stopping the motor. The filter element 49, having been cleaned, will permit a relatively rapid filtration of oil, and the level 100 in the chamber 16 will rapidly rise. As the float 138 is swung upwardly by the rise of the level 100, the arm 140 will swing downwardly, but without operation of the levers 143 and 144 owing to the fact that the leftward end of the dog 142 may swing upwardly and pass the levers 144 and 143 without actuating such levers.

This means of intermittently operating the motor 35 so as to intermittently operate the pump 23 is especially suitable where the filtering device is employed in the filtration of fluids having small volatile content.

Although we have shown a drain-pipe 85 having a valve 87 therein, connected to the lower end of the chamber 15 for the drainage of sediment from the lower end of such chamber, the device is so designed that the flow of oil from the chamber 15 through the pipe 66 to the pipe 92 will carry sediment from the lower end of the chamber 15 and will accordingly prevent an excess accumulation of sediment. The sediment-removing action is contributed to by the surging effect which is produced between the body of oil contained in the lower and upper chambers 15 and 16 in response to the variations in pressure in these chambers as a result of the operation of the pump 23 and the release of bodies of gas from the upper parts of the respective chambers.

Although we have herein shown and described our invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

We claim as our invention:

1. A filtering device of the character described, including: walls forming a primary chamber and a secondary chamber connected through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; a pump connected to said passage between said filter element and said secondary chamber and having normally stationary impeller means forming part of said passage and being adapted, when actuated, to reverse the flow of fluid through said passage and said filter element therein; means for periodically actuating said pump to reverse the fluid flow through said filter element to clean the same, and an overflow pipe extending upwardly from the primary chamber to a point above the outlet for the secondary chamber, said pipe acting to vent gas, discharge excess fluid and carry off dislodged filter cake from the primary chamber.

2. A filtering device of the character described, including: walls forming a primary chamber and a secondary chamber located at a higher level than the primary chamber and connected thereto through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; a pump connected to said passage having normally stationary impeller means forming part of said passage and being adapted, when actuated, to reverse the flow of fluid through said passage and said filter element therein; means for intermittently actuating said pump to reverse the fluid flow through said filter element to clean the same; and an overflow pipe extending upwardly from said primary chamber above the outlet for the secondary chamber to control the pressure which may be placed on the fluid in said primary chamber.

3. A filtering device of the character described, including: walls forming a primary chamber and a secondary chamber located at a higher level than the primary chamber and connected thereto through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; a pump connected to said passage having normally stationary impeller means forming part of said passage and being adapted, when actuated, to reverse the flow of fluid through said passage and said filter element therein; means for intermittently actuating said pump to reverse the fluid flow through said filter element to clean the same; and stand pipes extending upwardly from said primary and secondary chambers for controlling the pressures which may be placed on the fluid contents of said chambers, the pipe for the primary chamber extending above the outlet for the secondary chamber.

4. A filtering device of the character described, including: walls forming a primary chamber and a secondary chamber located at a higher level than the primary chamber and connected thereto through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; a pump connected to said passage having normally stationary impeller means forming part of said passage and being adapted, when actuated, to reverse the flow of fluid through said passage and said filter element therein; means for intermittently actuating said pump to reverse the fluid flow through said filter element to clean the same; and stand pipes extending upwardly from said primary and secondary chambers for controlling the pressures which may be placed on the fluid contents of said chambers, the stand pipe from the primary chamber extending above the outlet for the secondary chamber, the stand pipe from said secondary chamber rising to a higher level than the stand pipe from said primary chamber.

5. A filtering device of the character described, including: walls forming a primary chamber and a secondary chamber connected through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; a pump connected to said passage having normally stationary impeller means forming part of said passage and being adapted, when actuated, to reverse the flow of fluid through said passage and said filter element therein; means for intermittently actuating said pump to reverse the fluid flow through said filter element to clean the same; gas venting stand pipes extending upwardly from said primary and secondary chambers for controlling the pressures which may be placed on the fluid contents of said chambers, the stand pipe for the primary chamber extending above the outlet for the secondary chamber so as to act as a fluid overflow for the primary chamber, the stand pipe from said secondary chamber rising to a higher level than the stand pipe from said primary chamber; and a conduit member connected to the upper ends of both of said stand pipes for carrying off the vented gas and fluid overflow from said chambers.

6. A filtering device of the character described, including: walls forming a primary chamber and a secondary chamber connected through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; a pump connected to said passage having normally stationary impeller means forming part of said passage and being adapted, when actuated, to reverse the flow of fluid through said passage and said filter element therein; means for intermittently actuating said pump to reverse the fluid flow through said filter element to clean the same; stand pipes extending upwardly from said primary and secondary chambers for controlling the pressures which may be placed on the fluid contents of said chambers; and a conduit member connected to the upper ends of both of said stand pipes, there being means for preventing a downward flow of fluid through said stand pipe from said secondary chamber.

7. A filtering device of the character described, including: walls forming a primary chamber and a secondary chamber connected through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; a pump connected to said passage having normally stationary impeller means forming part of said passage and being adapted, when actuated, to reverse the flow of fluid through said passage and said filter element therein; means for intermittently actuating said pump to reverse the fluid flow through said filter element to clean the same; stand pipes extending upwardly from said primary and secondary chambers for controlling the pressures which may be placed on the fluid contents of said chambers, the stand pipe from said secondary chamber rising to a higher level than the stand pipe from said primary chamber; and a conduit member connected to the upper ends of both of said stand pipes, there being means for preventing a downward flow of fluid through said stand pipe from said secondary chamber.

8. A filtering device of the character described, including: walls forming a primary chamber and a secondary chamber connected through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; and an overflow pipe extending upwardly from said primary chamber above the outlet for the secondary chamber to control the pressure which may be placed on the fluid in said primary chamber.

9. A filtering device of the character described, including: walls forming a primary chamber and a secondary chamber connected through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; and stand pipes extending upwardly from said primary and secondary chambers for controlling the pressures which may be placed on the fluid contents of said chambers, the stand pipe from the primary chamber extending above the outlet for the secondary chamber, the stand pipe from said secondary chamber rising to a higher level than the stand pipe from said primary chamber.

10. A filtering device of the character described, including: walls forming a primary chamber and a secondary chamber connected through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; gas venting stand pipes extending upwardly from said primary and secondary chambers for controlling the pressures which may be placed on the fluid contents of said chambers, the stand pipe for the primary chamber extending above the outlet for the secondary chamber so as to act as a fluid overflow for the primary chamber, the stand pipe from said secondary chamber rising to a higher level than the stand pipe from said primary chamber; and a conduit member connected to the upper ends of both of said stand pipes for carrying off the vented gas and fluid overflow from said chambers.

11. A filtering device of the character described, including: walls forming a primary chamber and a secondary chamber connected through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; stand pipes extending upwardly from said primary and secondary chambers for controlling the pressures which may be placed on the fluid contents of said chambers; and a conduit member connected to the upper ends of both of said stand pipes, there being means for preventing a downward flow of fluid through said stand pipe from said secondary chamber.

12. A filtering device of the character described, including: walls forming a primary chamber and a secondary chamber connected through a passage, said passage having means at one end providing access thereto and a dividing wall therein having an opening; a cylindrical filter element adapted to pass through said access means and through said opening of said dividing wall, there being a flange on the end of said filter element for sealing engagement with said dividing wall; means for holding said flange in engagement with said dividing wall; means for delivering fluid into said primary chamber under such pressure that there will be produced a flow of fluid from said primary chamber through said filter element to said secondary chamber; an outlet for removal of filtered fluid from said secondary chamber; a pump connected to said passage having normally stationary impeller means forming part of said passage and being adapted, when actuated, to reverse the flow of fluid through said passage and said filter element therein; means for intermittently actuating said pump to reverse the fluid flow through said filter element to clean the same; gas venting stand pipes extending upwardly from said primary and secondary chambers for controlling the pressures which may be placed on the fluid contents of said chambers, the stand pipe for the primary chamber extending above the outlet for the secondary chamber so as to act as a fluid overflow for the primary chamber, the stand pipe from said secondary chamber rising to a higher level than the stand pipe from said primary chamber; and a conduit member connected to the upper ends of both of said stand pipes for carrying off the vented gas and fluid overflow from said chambers.

13. A filtering device of the character described, including: walls forming a primary chamber and a secondary chamber connected through a passage; a filter element in said passage; means for delivering fluid into said primary chamber under such pressure that there will be produced a flow of fluid from said primary chamber through said filter element to said secondary chamber; an outlet for removal of filtered fluid from said secondary chamber; a pump connected to said passage having normally stationary impeller means forming part of said passage and being adapted, when actuated, to reverse the flow of fluid through said passage and said filter element therein; means for intermittently actuating said pump to reverse the fluid flow through said filter element to clean the same; and stand pipes extending upwardly from intermediate planes in said primary and secondary chambers for controlling the pressures which may be placed on the fluid contents of said chambers and for forming gas spaces in the upper parts of said chambers, the pipe for the primary chamber extending above the outlet for the secondary chamber.

14. A filter device of the character described, including: a wall forming a chamber having a pair of spaced openings; a filter member connected to one of said openings for filtering a fluid and delivering it into said chamber through said opening; and flow reversing means insertable through the other of said openings, said means comprising a rotary pump having a discharge member releasably connected to said first-named opening and having its intake ports communicating with the interior of said chamber, there being driving means for said pump extending through said second-named opening and means for sealing said second-named opening.

15. A filter device of the character described, including: a wall forming a chamber having a pair of spaced openings; a filter member connected to one of said openings for filtering a fluid and delivering it into said chamber through said opening; flow reversing means insertable through the other of said openings, said flow reversing means comprising a cover plate for sealing said second-named opening, and a rotary pump secured to the inner face of said cover plate, said pump having its outlet releasably secured to said first-named opening and its inlet communicating with the interior of said chamber; and means extending through said cover plate to said pump for driving the same.

CLARENCE J. COBERLY.
EDMOND M. WAGNER.